United States Patent Office 3,505,138
Patented Apr. 7, 1970

3,505,138
METHOD OF JOINING BERYLLIA TO ANOTHER CERAMIC BODY
James M. Nuding, Canoga Park, Calif., assignor, by mesne assignments, to the United States of America as represented by the United States Atomic Energy Commission
No Drawing. Filed Mar. 7, 1960, Ser. No. 12,947
Int. Cl. C03b 29/00; C03c 27/00
U.S. Cl. 156—89                                6 Claims My invention relates to a method of joining ceramic members and more particularly to a method of joining beryllia with another ceramic body.

Beryllium, because of its excellent moderating properties, finds use in nuclear reactors as a nuclear reactor core component, particularly in the form of BeO which has excellent high temperature characteristics. Beryllia may be used in a hetergeneous core, that is, where the fuel elements are separate from the moderator, and also in a solid homogeneous core, where the fissile material, commonly $UO_2$, is distributed in the BeO matrix. For such uses it is frequently necessary to join BeO members together. It is also required on occasion to join BeO to $Al_2O$. Alumina has excellent high temperature strength characteristics, suffers less from neutron damage than other ceramics, is of low toxicity, and has a relatively low thermal neutron absorption cross-section. These properties recommend alumina as a structural material in a high temperature reactor core. In such applications BeO, fueled or unfueled, could be supported in a framework or spider network of $Al_2O_3$; joining of BeO and $Al_2O_3$ members would be necessary in such instances.

An object of my present invention, therefore, is to provide a method of joining BeO to another ceramic member with a strong, high temperature bond.

Another object is to provide a method of joining together beryllia members in a strong, high temperature bond with a material of excellent strength characteristics and low thermal neutron absorption cross-section.

Another object is to provide a method of joining together BeO and $Al_2O_3$ members with a strong, high temperature bond of relatively low thermal neutron absorption cross-section.

Still another object is to provide such a joining method which is relatively economical, rapid, and efficient.

Other objects and advantages of my invention will appear from the following detailed description taken together with the appended claims.

In accordance with my present invention I have provided a method of joining BeO to a second ceramic member selected from the group consisting of BeO and $Al_2O_3$, which comprises contacting said members, covering the contact point between said members with an alumina powder paste, and while maintaining said contacting relationship, heating said members in a neutral environment at a temperature of about 1650–1900° C. until a bond is formed, and then slowly cooling the resulting joined members to ambient atmospheric temperature.

I find that my cementing method using an alumina paste results in a very strong high temperature bond between beryllia and an alumina or a second beryllia member. Tubes with such joints easily withstand pressure gradients of 15 p.s.i. over short sections without fracturing. Such tubes also withstand severe thermal shock, for example as occurs when a tube maintained at a temperature of about 1600° C. suddenly has ambient air passed through, in which case the inside of the tube approaches room temperature, while the outside remains at about 1600° C. My method is also relatively easy to perform, involving only the application of the alumina powder paste to members held in joining relationship, followed by firing under neutral conditions for a short time.

My cement consists of powdered $Al_2O_3$ in the form of a thick aqueous mixture or paste. The $Al_2O_3$ powder may vary widely in particle size while achieving satisfactory results. However, the powder should not consist of too coarse grains; a powder size of about 150 mesh to 600 mesh is very satisfactory, while a mesh size of about 350 is particularly useful. Such powder is mixed with a small amount of water to form a paste. The amount of water may satisfactorily vary and generally only sufficient water to make a viscous paste is required. This will be in the order of about 1–10 volume percent, while about 2–4 volume percent water is particularly suitable. The cement will remain in a viscous condition for an extended period of time, although it will eventually dry, and thus immediate application of this cement is not required.

The BeO body which is joined to another BeO body or to an $Al_2O_3$ body, may be fueled to a high percentage or unfueled without affecting the joining operation. The BeO is most commonly fueled with $UO_2$ homogeneously distributed in the BeO matrix, but other ceramic uranium forms, such as higher uranium oxides, uranium nitride, carbide or sulfide may also be contained; fertile material such as $ThO_2$ may also be included in the BeO matrix without affecting the cementing operation.

The members to be joined, which are frequently in tubular shape, may be contacted in a number of different manners, and the employment of any single method is not essential or critical. For instance, tubular members may be fitted, or joined in mating relationship. However, such engagement is not necessary, as flat surfaces can be contacted, for instance in the joining of two tubes of the same diameter with flat ends. The surfaces should be held in contact by suitable means until after the firing. However, application of pressure to the surfaces is not required. Either before or after the surfaces are contacted in joining relationship, the cement is applied by suitable means, for instance brushing. Sufficient cement should be used to fill cracks between the joints and produce a fillet; however, the amount of cement is not critical. The cement at this point has small strength (i.e., green strength).

The members are then fired in a furnace in a neutral or non-reactive environment, by which is meant in a vacuum or in an inert gas atmosphere, such as is furnished by a noble gas, for instance argon, helium, krypton, etc. Argon is the preferred atmosphere.

The firing temperature may satisfactorily vary between about 1650–1900° C., with a temperature of about 1800° C. being preferred. At such temperature, the alumina paste becomes molten rather rapidly, and the bond is formed within a relatively few minutes, for instance 2–5 minutes. The ceramic pieces are then slowly cooled to room temperature to prevent any fractures resulting from thermal gradients. For instance, tubes with ½″ O.D. and ¼″ bore are returned from firing at 1650–1900° C. to room temperature over a 30 minute period. With thicker pieces, proportionately longer time is taken.

The mechanism by which my cement produces a superior high temperature bond between the ceramic pieces is not fully understood, and I do not wish to be bound by any particular hypothesis. However, it appears that a eutectic forms between $Al_2O_3$ and BeO in the neighborhood of 1650–1800° C. The weight proportions of the eutectic appear to satisfactorily vary over a wide range without affecting the quality of the joint. For instance, it appears that the eutectic is BeO-rich towards the BeO member with the concentration gradient changing to an $Al_2O_3$-rich eutectic as the alumina member is approached. Since the cement appears to be an $Al_2O_3$-BeO eutectic, it is possible, when such members are to be joined, to form the joint directly without use of the $Al_2O_3$ cement, under the above conditions. This would be the case when sufficient surface contact area is made for eutectic formation, as with engagement of mating surfaces. However, even in such cases, it is still desirable to use some additional $Al_2O_3$ cement since it makes the process easier to carry out and promotes formation of the eutectic.

The following examples are offered to illustrate my invention in greater detail.

EXAMPLE I

An assembly of two BeO tubes, both ½" O.D. with ¼" bore, 4" length, was hung vertically from a small molybdenum rod which passed down through the center of the tubes and was itself hanging from a wire at its upper end. The contact surfaces were painted with a paste of pure alumina powder, 350 mesh, containing about 3 volume percent distilled water. The cement was allowed to air-dry for a few hours and the assembly lowered into a quartz cylinder which contained a graphite susceptor 6" long, 1" I.D. and 2" O.D. The susceptor was supported inside a smaller quartz cylinder, which also contained about a 3/16" layer of lamp black between its inner wall and the O.D. of the susceptor for thermal insulation.

The outer containing quartz tube was stoppered at its upper end with a large rubber stopper through which the supporting wires from the molybdenum rod and the quartz susceptor support were threaded. An argon gas inlet tube also was passed through the rubber stopper.

The lower end of the outer quartz containing tube was inserted into a flexible rubber hose which went to an exhaust system and air filter. This was to prevent any BeO contamination of the room. An induction coil was supported around the outer quartz container and centered vertically with respect to the graphite suspector.

The upper joint in the BeO assembly was centered vertically and radially in the central hole of the suspector and the contained air in the whole apparatus flushed out with argon.

The power was set at 3.2 kw. for 7 minutes, which gave a temperature of about 1400° C., and was then raised to 4 kw. for 8 minutes which gave a temperature of about 1650° C. The power was reduced to 3.4 kw. (about 1500° C.) for 10 minutes and then turned off.

Optical pyrometer readings were taken through a glass window in the rubber stopper. These readings were made of the inner wall of the BeO assembly at the joint. The cement was observed to melt while watching with the optical pyrometer.

After cooling for 30 minutes the assembly was inspected and an excellent joint was found to have been made. A fillet of $BeO-Al_2O_3$ eutectic completely filled the crack at the joint. The eutectic had a characteristic snow-white, crystalline structure, was very hard, and did not crack upon cooling to room temperature.

EXAMPLE II

The specimen cemented consisted of two $Al_2O_3$ tubes of ½" O.D., 5/16" I.D., with a central section of a BeO tube, hexagon in cross section, 5/16" flat to flat x 4¼" long x 3/16" hole, flat to flat. Total weight of BeO was 10.2195 gm.

The BeO tube was machined approximately round on each end to fit into a BeO bushing which adapted the hex tubes to the I.D. of the $Al_2O_3$ tubes. The $Al_2O_3$ cement was prepared and applied as in Example I, and the same experimental procedure was followed. Upon cooling, the joint was found to be strong and well filletted with $BeO-Al_2O_3$.

The specimens in the above examples were tested by heating up to 1800° C. under compressive loads up to 50 pounds per square inch, internal pressures of approximately 75 p.s.i.g. and varying air mass flows and humidities.

Thermal shock tests were conducted by heating the joined tubes in a "blow tube" furnace in a static atmosphere to temperature equilibriums of 1800° C., and then suddenly introducing room temperature air through the center bore at flows up to 20 s.c.f.m. No tube failures occurred at the cemented joints, which resulted from the strength of the bond, and a coefficient of expansion very similar to those of BeO and $Al_2O_3$.

It should be understood that the above examples are illustrative rather than restrictive of my invention. My invention should be understood as being limited only by the scope of the appended claims.

Having thus described my invention, I claim:

1. A method of joining a preformed, structural BeO member to a second preformed, structural ceramic member selected from the group consisting of BeO and $Al_2O_3$, which comprises contacting said members, covering the contact points between said members with an aqueous alumina powder paste, and while maintaining said contacting relationship, heating said members in a neutral environment at a temperature of about 1650–1900° C. until a bond is formed, and then slowly cooling the resulting joined members to the ambient atmospheric temperature.

2. The method of claim 1 wherein said second ceramic member is BeO.

3. A method of joining a preformed, structural BeO member to a second preformed, structural ceramic member selected from the group consisting of BeO and $Al_2O_3$, which comprises contacting said members, covering said members at the contact points with a water paste of alumina powder, said alumina powder being of about 150–600 mesh size, and while maintaining said contacting relationship without applying substantial pressure to said members, heating said members in a noble gas environment at a temperature of about 1650–1900° C. until a bond is formed, and then slowly cooling the resulting joined members to the ambient atmospheric temperature.

4. The method of claim 3 wherein said gas is argon.

5. The method of claim 3, wherein said second ceramic member is BeO, and said temperature is about 1800° C.

6. The method of claim 3, wherein said second ceramic member is $Al_2O_3$.

References Cited

UNITED STATES PATENTS

| | | |
|---|---|---|
| 2,173,107 | 9/1939 | Gould. |
| 2,538,959 | 1/1951 | Ballard. |
| 2,844,919 | 7/1958 | Power _____ 49—81 |
| 2,889,952 | 6/1959 | Claypoole _____ 49—82 X |
| 2,091,569 | 8/1937 | Ridgway. |

CARL D. QUARFORTH, Primary Examiner

H. E. BEHREND, Assistant Examiner

U.S. Cl. X.R.

65—43